United States Patent [19]
Koizumi

[11] Patent Number: 5,612,823
[45] Date of Patent: Mar. 18, 1997

[54] WIDE-FIELD EYEPIECE WITH INSIDE FOCUS

[75] Inventor: Noboru Koizumi, Saitama-ken, Japan

[73] Assignee: Fuji Photo Optical Co., Ltd., Saitama-ken, Japan

[21] Appl. No.: 383,435

[22] Filed: Feb. 3, 1995

[30] Foreign Application Priority Data

Feb. 15, 1994 [JP] Japan ............................... 6-18136

[51] Int. Cl.$^6$ .............................. G02B 25/00; G02B 9/34
[52] U.S. Cl. ............................................. 359/644; 359/783
[58] Field of Search .......................... 359/643, 644, 359/783

[56] References Cited

U.S. PATENT DOCUMENTS

| | | | |
|---|---|---|---|
| 3,233,513 | 2/1966 | Wagner et al. | 359/644 |
| 3,352,620 | 11/1967 | Scidmore et al. | 359/644 |
| 4,747,675 | 5/1988 | Nagler | 359/643 |

FOREIGN PATENT DOCUMENTS

| | | |
|---|---|---|
| 2-123319 | 5/1990 | Japan . |
| 5-67005 | 9/1993 | Japan . |

*Primary Examiner*—Georgia Y. Epps
*Assistant Examiner*—Jordan M. Schwartz
*Attorney, Agent, or Firm*—Sixbey, Friedman Leedom & Ferguson; Gerald J. Ferguson, Jr.; Evan R. Smith

[57] ABSTRACT

A wide field eyepiece with inside focus includes first and second lens groups $G_1$ and $G_2$. The first lens group $G_1$ includes a negative cemented lens component and the second lens group $G_2$ includes a positive lens component whose face of greater curvature is faced toward the eye point, a positive cemented lens component and a positive lens component whose face of greater curvature is faced toward the object. The first and second lens groups $G_1$ and $G_2$ are arranged in this order from the object side. The following formulae (1), (2) and (3) are satisfied, $$-4 < f_1/f < -1.5 \quad (1)$$

$$1.3 < f_2/f < 2 \quad (2)$$

$$1 < d_{12}/f < 3.5 \quad (3)$$

wherein f represents the focal length of the overall lens system, $f_1$ represents the focal length of the first lens group $G_1$, $f_2$ represents the focal length of the second lens group $G_2$ and $d_{12}$ represents the axial air separation between the first lens group $G_1$ and the second lens group $G_2$.

6 Claims, 5 Drawing Sheets

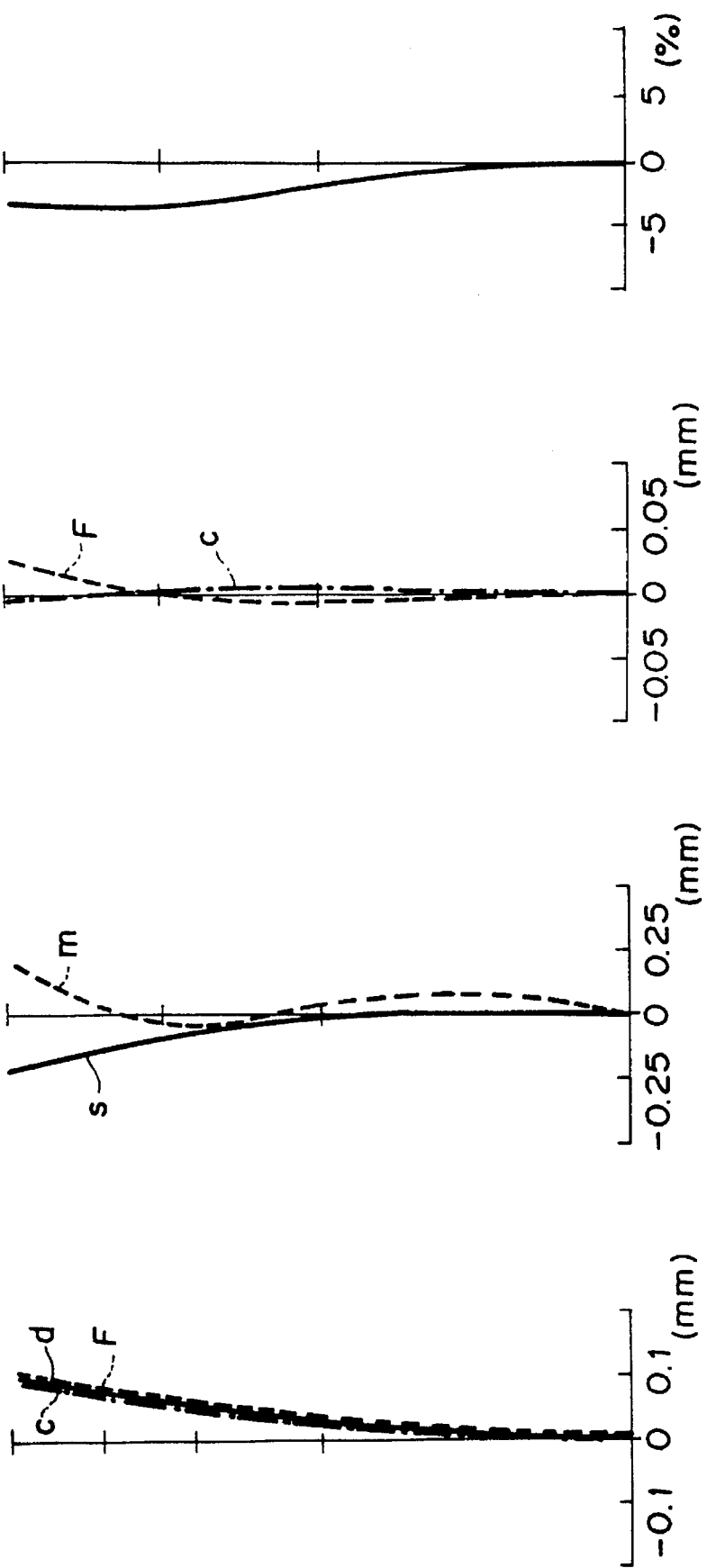

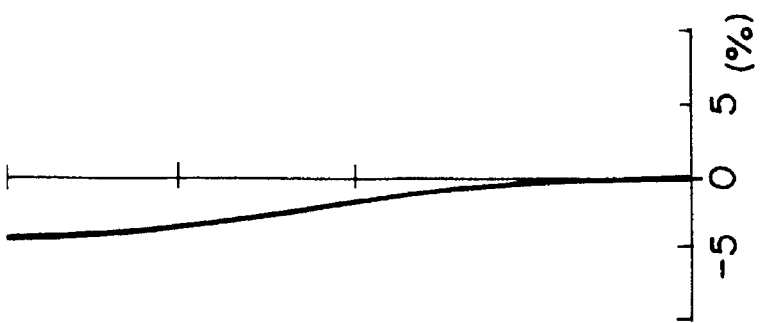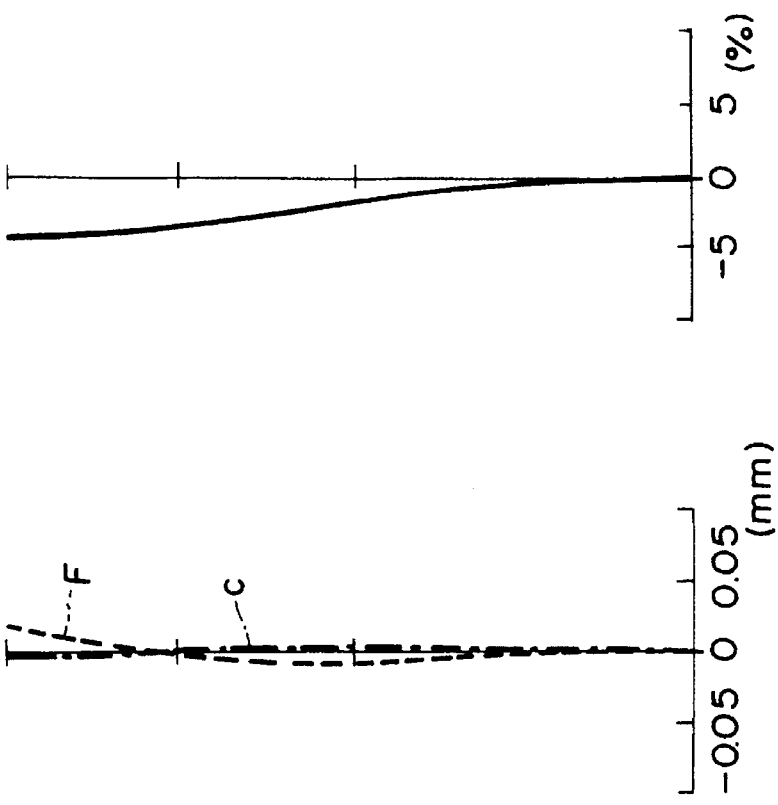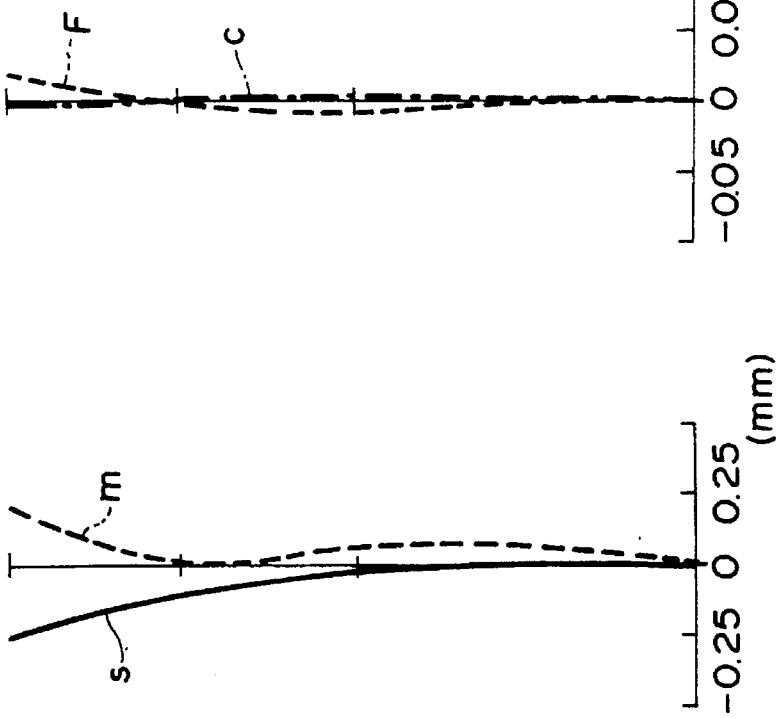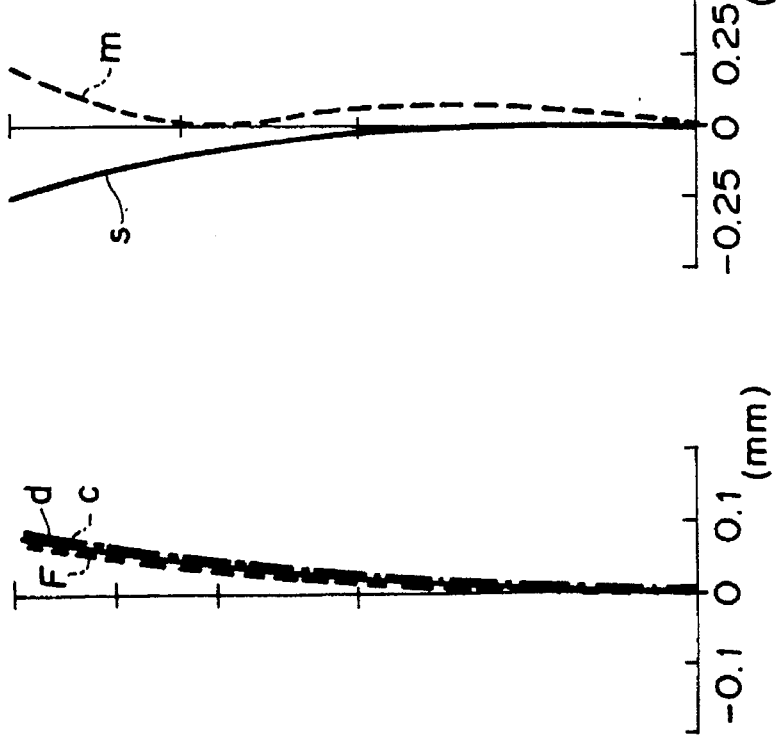

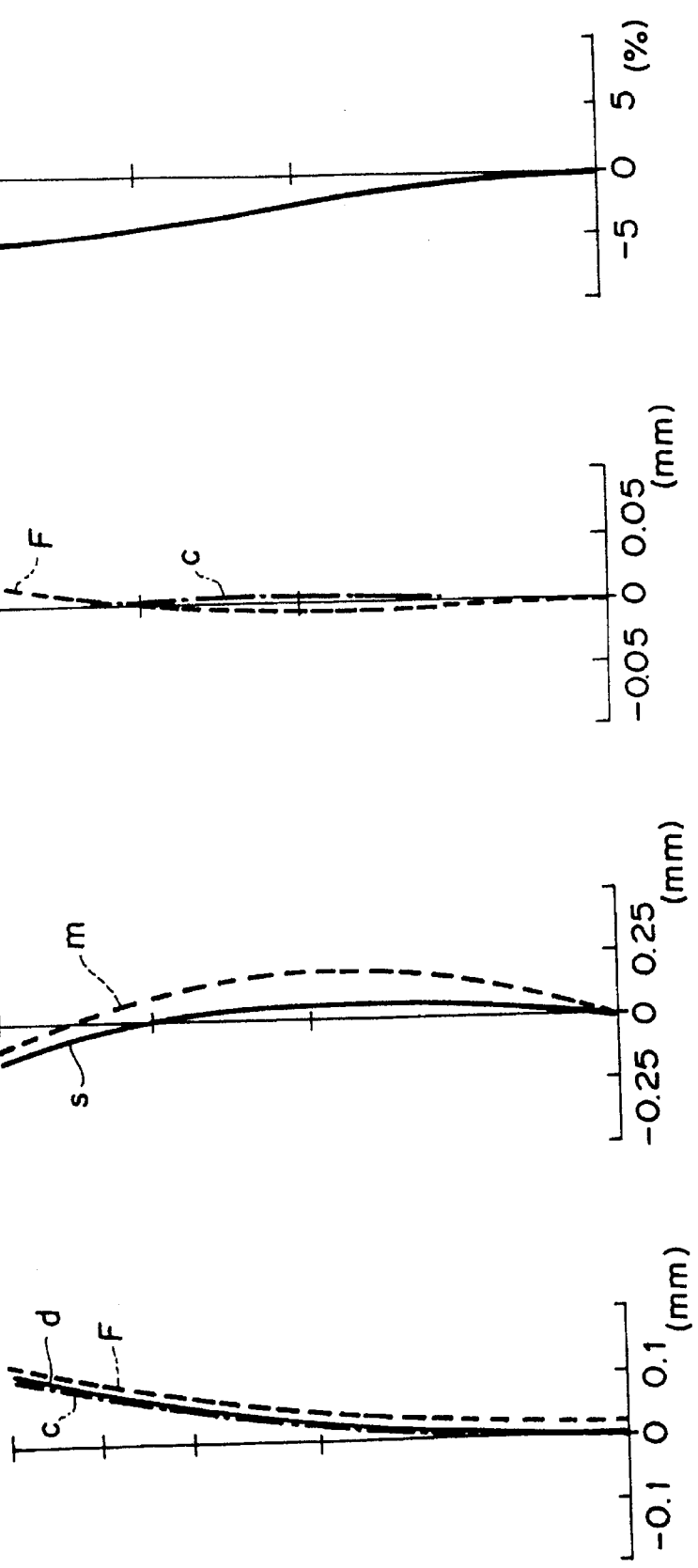

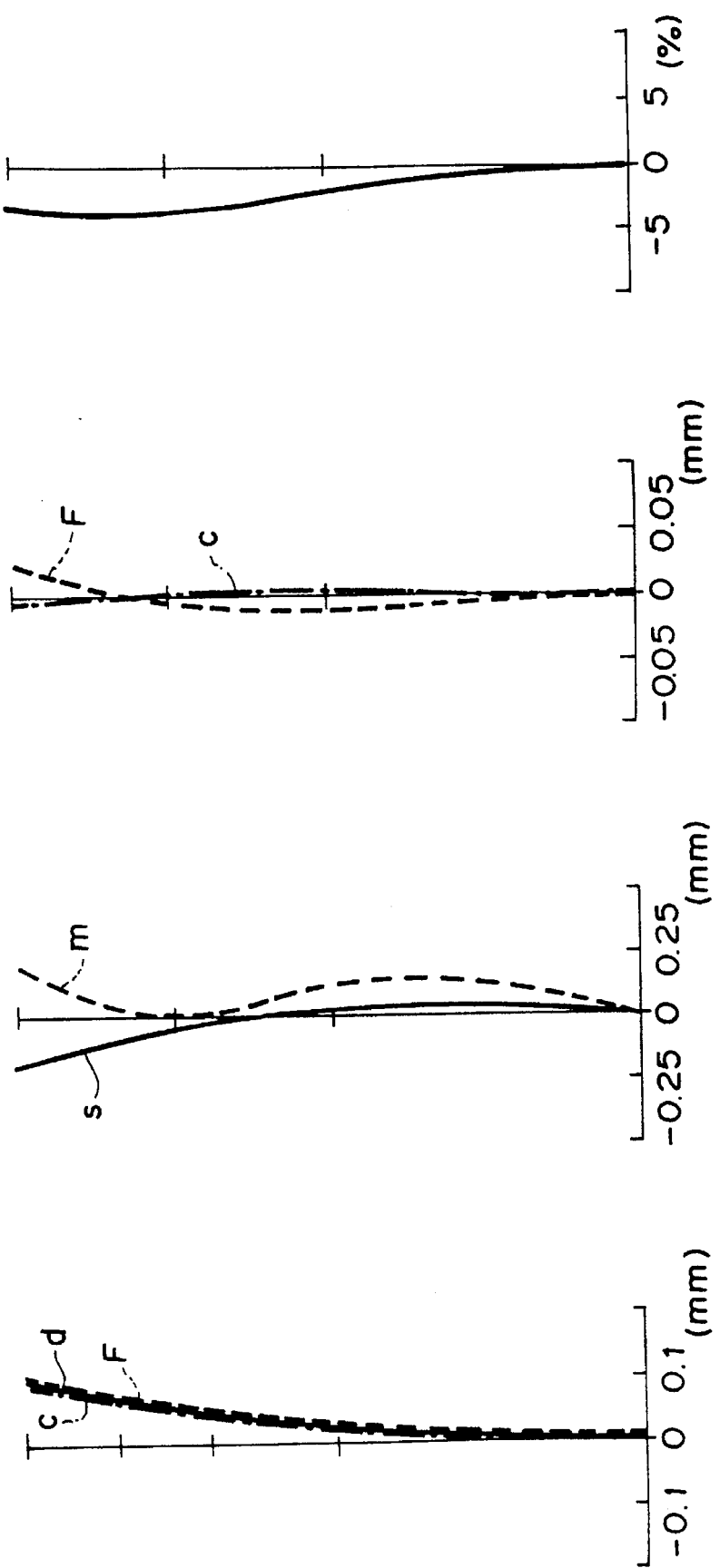
FIG. 5A SPHERICAL ABERRATION FNO=5.0
FIG. 5B ASTIGMATISM ω=27.5°
FIG. 5C LONGITUDINAL CHROMATIC ABERRATION ω=27.5°
FIG. 5D DISTORTION ω=27.5°

WIDE-FIELD EYEPIECE WITH INSIDE FOCUS

BACKGROUND OF THE INVENTION

Field of the Invention

This invention relates to a wide-field eyepiece with inside focus having a high magnification for use in a telescope, binocular or the like, and more particularly to an eyepiece for use in a monocular telescope for bird-watching.

Description of the Prior Art

In normal eyepieces, the distance between the eyepiece and the eye point tends to be shorter as the focal length of the overall system becomes smaller. This is because, since the optical system of normal eyepieces is similar to a telecentric optical system, the back focal point of the overall lens system is close to the eye point and the back focal length of the overall system becomes smaller as the focal length of the overall system becomes smaller.

For example, in an eyepiece which has a magnification of ×20 and a focal length of 12.5 mm, the distance to the eye point is small and not larger than about 10 mm, and in an eyepiece which has a magnification of ×33 and a focal length of 7.6 mm, the distance to the eye point is smaller and not larger than about 6 mm. Such eyepieces are difficult to use. Especially for a spectacled person, it is said that the distance to the eye point should be not smaller than 20 mm. With glasses, it is difficult to view through such an eyepiece having a small distance to the eye point.

With respect to the flatness of the image plane, the normal eyepieces have a large negative curvature of field and when an object at the center of the field is brought into focus, the image in the periphery of the field is blurred. This is because the normal eyepieces are formed by combination of lens elements or cemented lenses having positive refracting powers and the Petzval sum is a large positive power in such lenses having a positive refracting power. When the Petzval sum is a large positive power, a large negative curvature of field is generally generated.

There has been known a high magnification eyepiece which has a distance to the eye point not smaller than 1.5 times the focal length, is excellent in flatness of the image plane and is small in distortion as disclosed, for instance, in Japanese Unexamined Patent Publication No. 2(1990)-123319 and Japanese Patent Publication No. 5(1993)-67005.

When bird-watching through a high magnification monocular telescope, the bird-watcher generally wants to see the object bird in a true color. However the conventional eyepieces for the monocular telescopes or the like are not good in chromatic aberration and color reproductivity is unsatisfactory. For instance, color shading occurs in the periphery of the field.

SUMMARY OF THE INVENTION

In view of the foregoing observations and description, the primary object of the present invention is to provide a wide-field eyepiece with inside focus which has a high magnification and a distance to the eye point not smaller than 1.5 times the focal length and is excellent in flatness of the image plane, in distortion and in chromatic aberration.

The wide-field eyepiece with inside focus in accordance with the present invention comprises a first lens group $G_1$ having a negative cemented lens component and a second lens group $G_2$ having a positive lens component whose face of greater curvature is faced toward the eye point, a positive cemented lens component and a positive lens component whose face of greater curvature is faced toward the object, the first and second lens groups $G_1$ and $G_2$ being arranged in this order from the object side.

In the eyepiece of the present invention, the following formulae (1), (2) and (3) are satisfied, $$-4 < f_1/f < -1.5 \qquad (1)$$

$$1.3 < f_2/f < 2 \qquad (2)$$

$$1 < d_{12}/f < 3.5 \qquad (3)$$

wherein f represents the effective focal length of the overall lens system, $f_1$ represents the effective focal length of the first lens group $G_1$, $f_2$ represents the effective focal length of the second lens group $G_2$ and $d_{12}$ represents the axial air separation between the first lens group $G_1$ and the second lens group $G_2$.

In the wide-field eyepiece with inside focus of the present invention, an image from an objective is focused in a position between the first lens group $G_1$ and the second lens group $G_2$. The second lens group $G_2$ consists of a single positive lens component, a cemented positive lens component and a single positive lens component arranged in this order from the focusing position toward the eye point and accordingly the distance between the focusing position and the cemented positive lens component can be long enough. The cemented lens component has a function of correcting chromatic aberration and when the distance between the focusing position and the cemented positive lens component is long enough, a chromatic aberration balance, that is, a correction balance of axial chromatic aberration and longitudinal chromatic aberration, can be excellent.

The above formula (1) relates to the distance to the eye point and the flatness of the image plane.

The first lens group $G_1$ magnifies the image from the objective by the diverging effect thereof and focuses the magnified image near the second lens group $G_2$ and at the same time brings the entrance pupil to the second lens group $G_2$ near the second lens group $G_2$, thereby bringing the exit pupil or the eye point, on which the second lens group $G_2$ focuses an image, away from the second lens group $G_2$, which results in a longer distance to the eye point. Further since the first lens group $G_1$ includes a negative lens component, the Petzval sum which is an index of the curvature of field can be reduced and the image plane is flattened.

When $f_1/f$ is not larger than −4, the negative lens component of the first lens group $G_1$ becomes weak and the diverging effect of the first lens group $G_1$ lowers, whereby the image from the objective is focused in a position far from the second lens group $G_2$ and the entrance pupil to the second lens group $G_2$ becomes far from the second lens group $G_2$. Thus the exit pupil or the eye point is brought near the second lens group $G_2$ due to the converging effect of the second lens group $G_2$, which results in a shorter distance to the eye point. Further the Petzval sum of the overall system becomes large and the image plane cannot be flat.

When $f_1/f$ is not smaller than −1.5, the negative lens component of the first lens group $G_1$ becomes too strong and the height of light beam entering the second lens group $G_2$ is increased, which results in an unsatisfactory correction of abaxial aberrations, especially coma and distortion. Further the pupil aberration deteriorates and an eclipse can occur in the pupil.

The above formula (2) relates to the distance to the eye point and correction of the abaxial aberrations. When the focal length of the second lens group $G_2$ varies, the position of the back focal point moves. Since the exit pupil of the overall lens system for the main light beam from the objective which is converged by the first lens group $G_1$ is on the back focal point of the second lens group $G_2$, the distance to the eye point can be elongated by increasing the effective focal length $f_2$ of the second lens group $G_2$. When $f_2/f$ is not larger than 1.3, the eye point cannot be sufficiently away from the eyepiece. When $f_2/f$ is not smaller than 2, it becomes very difficult to satisfactorily correct abaxial aberrations generated by the first lens group $G_1$.

The above formula (b 3) relates to flatness of the image, the distance to the eye point and correction of the abaxial aberrations.

When $d_{12}/f$ is not larger than 1, the focal lengths of the first and second lens groups $G_1$ and $G_2$ become short and the Petzval sum becomes large, which results in deterioration in flatness of the image. Further since the effective focal length $f_2$ of the second lens group $G_2$ becomes short, the back focal point of the second lens group $G_2$ becomes near the second lens group $G_2$, which results in unsatisfactorily short distance to the eye point. When $d_{12}/f$ is not smaller than 3.5, the height of light beam entering the second lens group $G_2$ is increased, which results in an unsatisfactory correction of abaxial aberrations.

DESCRIPTION OF THE PREFERRED EMBODIMENTS

Figure 1:
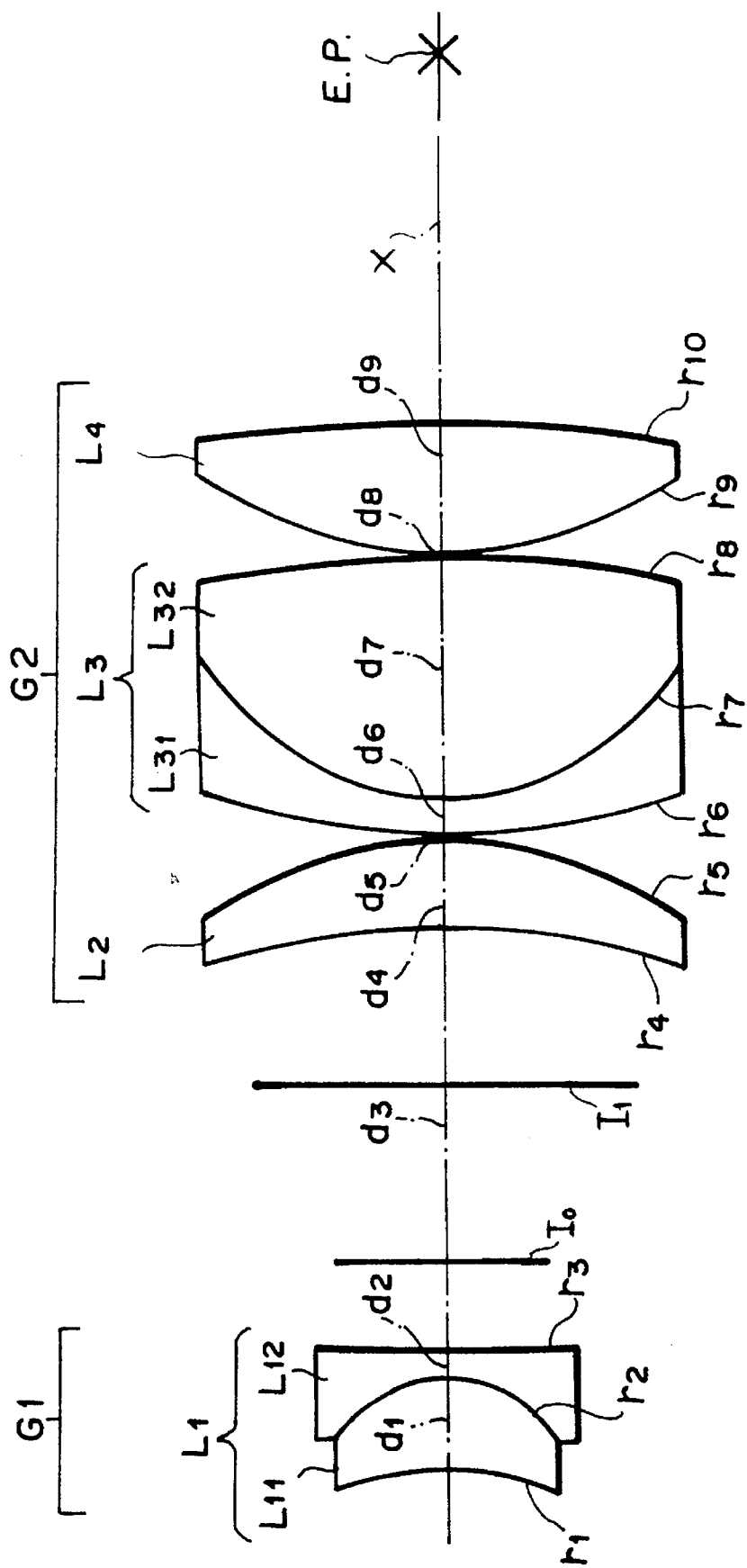
FIG. 1 is a schematic cross-sectional view showing the arrangement of the lens elements in eyepieces in accordance with first to fourth embodiments of the present invention, FIGS. 2A to 2D respectively show spherical aberration, astigmatism, longitudinal chromatic aberration and distortion of the eyepiece in accordance with the first embodiment of the present invention, FIGS. 3A to 3D respectively show spherical aberration, astigmatism, longitudinal chromatic aberration and distortion of the eyepiece in accordance with the second embodiment of the present invention, FIGS. 4A to 4D respectively show spherical aberration, astigmatism, longitudinal chromatic aberration and distortion of the eyepiece in accordance with the third embodiment of the present invention, and FIGS. 5A to 5D respectively show spherical aberration, astigmatism, longitudinal chromatic aberration and distortion of the eyepiece in accordance with the fourth embodiment of the present invention.

FIG. 1 shows the arrangement of lens elements in wide-field eyepieces with inside focus in accordance with first to fourth embodiments of the present invention. Each of the eyepieces is for use in a high magnification monocular telescope and comprises a first lens group $G_1$ and a second lens group $G_2$. The first lens group $G_1$ consists of first and second lens elements $L_{11}$ and $L_{12}$ which are cemented together to form a cemented lens component $L_1$. The second lens group $G_2$ consists of third to sixth lens elements $L_2$, $L_{31}$, $L_{32}$ and $L_4$, the fourth and fifth lens elements $L_{31}$ and $L_{32}$ being cemented together to form a cemented lens component $L_3$. A light bundle which carries information on an object and enters the first lens group $G_1$ through an objective (not shown) is focused in the position indicated at $I_1$ and viewed by an eye of the observer held in the position of an eye point E.P. $I_0$ indicates the position of focal point of the objective.

The first lens element $L_{11}$ is a positive meniscus lens convex toward the eye point side. The second lens element $L_{12}$ is a double-concave lens and is positioned so that its face of greater curvature is faced toward the object side in the first, third and fourth embodiments. In the second embodiment, the second lens element $L_{12}$ is a negative meniscus lens convex toward the eye point side. The third lens element $L_2$ is a positive meniscus lens convex toward the eye point side. The fourth lens element $L_{31}$ is a negative meniscus lens convex toward the object side. The fifth and sixth lens elements $L_{32}$ and $L_4$ are double-convex lenses and are positioned so that their faces of greater curvature are faced toward the object side.

In these lens systems, by disposing the third lens element $L_2$ between the cemented lens component $L_3$ and the focal point $I_1$, the cemented lens component $L_3$ can be at a distance from the focal point $I_1$, whereby chromatic aberration correction balance can be improved.

These eyepiece lens systems satisfy the following formulae (1), (2) and (3), $$-4 < f_1/f < -1.5 \tag{1}$$

$$1.3 < f_2/f < 2 \tag{2}$$

$$1 < d_{12}/f < 3.5 \tag{3}$$

wherein f represents the effective focal length of the overall lens system, $f_1$ represents the effective focal length of the first lens group $G_1$, $f_2$ represents the effective focal length of the second lens group $G_2$ and $d_{12}$ represents the axial air separation between the first lens group $G_1$ and the second lens group $G_2$.

When formula (1) is satisfied, the distance to the eye point can be elongated and the flatness of the image plane can be improved. When formula (2) is satisfied, the distance to the eye point can be further elongated and the abaxial aberrations are better corrected. When formula (3) is satisfied, the distance to the eye point can be further elongated, the abaxial aberrations are better corrected and the flatness of the image plane can be further improved.

In addition to the above formulae (1), (2) and (3), the eyepiece lens systems of the first to fourth embodiments satisfy the following formulae (4) and (5).

$$20 < v_{32} - v_{31} \tag{4}$$

wherein $v_{31}$ represents the Abbe's number for sodium d-line of the fourth lens element $L_{31}$ (negative meniscus lens) forming the positive lens component $L_3$ of the second lens group $G_2$ and $v_{32}$ represents the Abbe's number for sodium d-line of the fifth lens element $L_{32}$ (double-convex lens) forming the positive lens component $L_3$ of the second lens group $G_2$.

$$f_{21} > 4f \tag{5}$$

wherein $f_{21}$ represents the focal length of the third lens element $L_2$ in the second lens group $G_2$ which is a positive meniscus lens convex toward the eye point side.

When the difference $v_{32} - v_{31}$ between the Abbe's number for sodium d-line of the fourth lens element $L_{31}$ and that of the fifth lens element $L_{32}$ is within the range defined by the above formula (4), the longitudinal chromatic aberration can be well corrected. Generally in the case of an eyepiece with inside focus, it is necessary to correct the longitudinal aberration on the second lens group $G_2$ as well as on the overall lens system. This is for the purpose of preventing a field ring or a scale disposed on the focal point of the second lens group $G_2$ from looking colored. When the difference $v_{32}-v_{31}$ becomes not larger than 20, correction of the longitudinal aberration becomes insufficient both on the second lens group $G_2$ and on the overall lens system and performance of the eyepiece deteriorates.

The above formula (5) is a condition necessary to well correct the distortion and the curvature of field and defines the suitable range of the shape and power of the third lens element L2 (a positive single lens element) in the second lens group $G_2$. When $f_{21}$ is not larger than 4 f, the flatness of the image plane deteriorates and performance of the eyepiece deteriorates.

The radii of curvature r(mm) of the refracting surfaces, the axial surface separations d (mm) (the central thicknesses of the lenses or the air separations), and the refractive indexes n and the Abbe's numbers ν of the lens elements for the d-line in the eyepieces in accordance with the first to fourth embodiments are as shown in tables 1 to 4, respectively. The numbers in the leftmost column of table 1 designate the numbers of the symbols r, d, n and ν as numbered from the object side. (the same for all the tables in this specification)

TABLE 1

|  | r | d | n | ν |
|---|---|---|---|---|
| 1 | −14.242 | 4.625 | 1.67270 | 32.1 |
| 2 | −6.253 | 1.300 | 1.62280 | 57.0 |
| 3 | 779.044 | 21.105 | | |
| 4 | −40.196 | 4.185 | 1.58913 | 61.2 |
| 5 | −20.892 | 0.300 | | |
| 6 | 38.529 | 1.700 | 1.78472 | 25.7 |
| 7 | 13.807 | 12.007 | 1.58913 | 61.2 |
| 8 | −59.157 | 0.300 | | |
| 9 | 21.001 | 6.628 | 1.58913 | 61.2 |
| 10 | −70.847 | | | |

In the first embodiment, the effective focal length f of the overall lens system, the effective focal length $f_1$ of the first lens group $G_1$, the effective focal length $f_2$ of the second lens group $G_2$, the focal length $f_{21}$ of the third lens element $L_2$, F-number FNO, the half angle of field ω, the distance E.P. to the eye point and the Petzval sum ΣP are as follows.

f=10.00, FNO=5.0
$f_1$=17.19, ω=27.5°
$f_2$=−25.55, E.P.=17.5
$f_{21}$=68.35, ΣP=0.0183

TABLE 2

|  | r | d | n | ν |
|---|---|---|---|---|
| 1 | −15.615 | 4.474 | 1.67270 | 32.1 |
| 2 | −6.375 | 1.300 | 1.62280 | 57.0 |
| 3 | −332.883 | 18.396 | | |
| 4 | −37.867 | 3.740 | 1.58913 | 61.2 |
| 5 | −20.775 | 0.300 | | |
| 6 | 37.790 | 1.700 | 1.78472 | 25.7 |
| 7 | 12.995 | 11.149 | 1.58913 | 61.2 |
| 8 | −38.502 | 0.300 | | |
| 9 | 19.441 | 5.802 | 1.58913 | 61.2 |
| 10 | −68.754 | | | |

In the second embodiment, the effective focal length f of the overall lens system, the effective focal length $f_1$ of the first lens group $G_1$, the effective focal length $f_2$ of the second lens group $G_2$, the focal length $f_{21}$ of the third lens element $L_2$, F-number FNO, the half angle of field ω, the distance E.P. to the eye point and the Petzval sum ΣP are as follows.

f=10.00, FNO=5.0
$f_1$=15.52, ω=27.5°
$f_2$=−31.04, E.P.=15.0
$f_{21}$=72.27, ΣP=0.0268

TABLE 3

|  | r | d | n | ν |
|---|---|---|---|---|
| 1 | −13.289 | 4.559 | 1.67270 | 32.1 |
| 2 | −6.198 | 1.300 | 1.62280 | 57.0 |
| 3 | 204.667 | 24.626 | | |
| 4 | −44.630 | 4.910 | 1.58913 | 61.2 |
| 5 | −20.635 | 0.300 | | |
| 6 | 38.702 | 1.700 | 1.78472 | 25.7 |
| 7 | 14.975 | 11.888 | 1.58913 | 61.2 |
| 8 | −212.917 | 0.300 | | |
| 9 | 22.430 | 7.061 | 1.58913 | 61.2 |
| 10 | −70.399 | | | |

In the third embodiment, the effective focal length f of the overall lens system, the effective focal length $f_1$ of the first lens group $G_1$, the effective focal length $f_2$ of the second lens group $G_2$, the focal length $f_{21}$ of the third lens element $L_2$, F-number FNO, the half angle of field ω, the distance E.P. to the eye point and the Petzval sum ΣP are as follows.

f=10.00, FNO=5.0
$f_1$=18.88, ω=27.5°
$f_2$=−22.21, E.P.=19.0
$f_{21}$=60.55, ΣP=0.0108

TABLE 4

|  | r | d | n | ν |
|---|---|---|---|---|
| 1 | −13.844 | 4.828 | 1.67270 | 32.1 |
| 2 | −6.014 | 1.300 | 1.62280 | 57.0 |
| 3 | 481.681 | 21.813 | | |
| 4 | −41.802 | 4.552 | 1.58913 | 61.2 |
| 5 | −19.925 | 0.300 | | |
| 6 | 54.130 | 1.700 | 1.71736 | 29.5 |
| 7 | 13.076 | 12.584 | 1.62280 | 57.0 |
| 8 | −76.086 | 0.300 | | |
| 9 | 21.696 | 6.433 | 1.58913 | 61.2 |
| 10 | −78.318 | | | |

In the fourth embodiment, the effective focal length f of the overall lens system, the effective focal length $f_1$ of the first lens group $G_1$, the effective focal length $f_2$ of the second lens group $G_2$, the focal length $f_{21}$ of the third lens element $L_2$, F-number FNO, the half angle of field ω, the distance E.P. to the eye point and the Petzval sum ΣP are as follows.

f=10.00, FNO=5.0
$f_1$=17.66, ω=27.5°
$f_2$=−24.60, E.P.=17.5
$f_{21}$=59.99, ΣP=0.0149

FIGS. 2A to 2D, FIGS. 3A to 3D, FIGS. 4A to 4D and FIGS. 5A to 5D respectively show spherical aberration, astigmatism, longitudinal chromatic aberration and distortion of the first to fourth embodiments.

As can be understood from FIGS. 2A to 2D, FIGS. 3A to 3D, FIGS. 4A to 4D and FIGS. 5A to 5D, the eyepiece of each embodiment is excellent in aberrations and has an excellent performance for use as a high magnification wide-field eyepiece.

The arrangement of the eyepiece in accordance with the present invention need not be limited to those described above in conjunction with the first to fourth embodiments, but the radius of curvature of each lens element, the axial surface separations (including the thickness of the lens elements) and the like may be variously modified without departing from the spirit and scope of the invention.

As can be understood from the description above, in accordance with the present invention, the curvature of field and the distortion can be effectively corrected together with the chromatic aberrations and at the same time, the distance to the eye point can be as long as not shorter than 1.5 times the focal length. Accordingly the eyepiece of the present invention is especially suitable for use in a monocular telescope for bird-watching.

What is claimed is:

1. A wide-field eyepiece with inside focus arranged from an object side to an eye point side, comprising a first lens group ($G_1$) having a negative cemented lens component and a second lens group ($G_2$) having a positive meniscus lens component with a first, convex face and a second, concave face opposed to the first face, said first face having a smaller radius of curvature than said second face, said first face facing the eye point side, a positive cemented lens component, and a positive lens component with a third face and a fourth face opposed to the third face, said third face having a smaller radius of curvature than said fourth face, said third face facing the object side, the first and second lens groups being arranged in this order from the object side, wherein the following formulae (1), (2) and (3) are satisfied, $$-4 < f_1/f < -1.5 \quad (1)$$

$$1.3 < f_2/f < 2 \quad (2)$$

$$1 < d_{12}/f < 3.5 \quad (3)$$

wherein f represents the focal length of the overall lens system, $f_1$ represents the focal length of the first lens group ($G_1$), $f_2$ represents the focal length of the second lens group ($G_2$) and $d_{12}$ represents the axial air separation between the first lens group ($G_1$) and the second lens group ($G_2$).

2. The wide field eyepiece of claim 1 wherein said positive meniscus lens, said positive cemented lens component, and said positive lens component of said second lens group are arranged in that order from the object side.

3. A wide-field eyepiece with inside focus comprising a first lens group ($G_1$) consisting of first and second lens elements ($L_{11}$) and ($L_{12}$) which are arranged in this order from the object side and cemented together to form a negative cemented lens component ($L_1$) and a second lens group ($G_2$) consisting of third to sixth lens elements ($L_2$, $L_{31}$, $L_{32}$ and $L_4$) arranged in this order from the object side, the fourth and fifth lens elements ($L_{31}$ and $L_{32}$) being cemented together to form a positive cemented lens component ($L_3$), said first lens element ($L_{11}$) being a positive meniscus lens convex toward the eye point side, said second lens element ($L_{12}$) being a double-concave lens having opposed first and second faces, with said first face having a smaller radius of curvature than said second face, said first face facing the object side, said third lens element ($L_2$) being a positive meniscus lens convex toward the eye point side having a third face and a fourth face opposed to the third face, said third face having a smaller radius of curvature than said fourth face, said third face facing the eye point side, said fourth lens element ($L_{31}$) being a negative meniscus lens convex toward the object side, and said fifth and sixth lens elements ($L_{32}$ and $L_4$) being double-convex lenses each having first and second opposed convex faces, wherein for each of said fifth and sixth lens elements said first convex face has a smaller radius of curvature than said second convex face, with each of said first convex faces faced toward the object side, said fifth lens element being a positive element;

wherein the first and second lens groups are arranged in this order from the object side and the following formulae (1), (2) and (3) are satisfied, $$-4 < f_1/f < -1.5 \quad (1)$$

$$1.3 < f_2/f < 2 \quad (2)$$

$$1 < d_{12}/f < 3.5 \quad (3)$$

where f represents the focal length of the overall lens system, $f_1$ represents the focal length of the first lens group ($G_1$), $f_2$ represents the focal length of the second lens group ($G_2$) and $d_{12}$ represents the axial air separation between the first lens group ($G_1$) and the second lens group ($G_2$).

4. A wide-field eyepiece with inside focus comprising a first lens group ($G_1$) consisting of first and second lens elements ($L_{11}$) and ($L_{12}$) which are arranged in this order from the object side and cemented together to form a negative cemented lens component ($L_1$) and a second lens group ($G_2$) consisting of third to sixth lens elements ($L_2$, $L_{31}$, $L_{32}$ and $L_4$) arranged in this order from the object side, the fourth and fifth lens elements ($L_{31}$ and $L_{32}$) being cemented together to form a positive cemented lens component ($L_3$), said first lens element ($L_{11}$) being a positive meniscus lens convex toward the eye point side, said second lens element ($L_{12}$) being a negative meniscus lens convex toward the eye point side, said third lens element ($L_2$) being a positive meniscus lens convex toward the eye point side having a third face and a fourth face opposed to the third face, said third face having a smaller radius of curvature than said fourth face, said third face facing the eye point side, said fourth lens element ($L_{31}$) being a negative meniscus lens convex toward the object side, and said fifth and sixth lens elements ($L_{32}$ and $L_4$) being double-convex lenses each having first and second opposed convex faces, wherein for each of said fifth and sixth lens elements said first convex face has a smaller radius of curvature than said second convex face, with each of said first convex faces faced toward the object side, said fifth lens element being a positive element;

wherein the first and second lens groups are arranged in this order from the object side and the following formulae (1), (2) and (3) are satisfied, $$-4 < f_1/f < -1.5 \quad (1)$$

$$1.3 < f_2/f < 2 \quad (2)$$

$$1 < d_{12}/f < 3.5 \quad (3)$$

where f represents the focal length of the overall lens system, $f_1$ represents the focal length of the first lens group ($G_1$), $f_2$ represents the focal length of the second lens group ($G_2$) and $d_{12}$ represents the axial air separation between the first lens group ($G_1$) and the second lens group ($G_2$).

5. A wide-field eyepiece with inside focus as defined in claim 3 or 4 in which:

$$20 < v_{32} - v_{31}$$

wherein $v_{31}$ represents the Abbe's number for sodium d-line of the fourth lens element ($L_{31}$) and $v_{32}$ represents the Abbe's number for sodium d-line of the fifth lens element ($L_{32}$).

6. A wide-field eyepiece with inside focus as defined in claim 5 in which:

$$f_{21} > 4f$$

wherein $f_{21}$ represents the focal length of the third lens element ($L_2$) in the second lens group ($G_2$).

* * * * *

UNITED STATES PATENT AND TRADEMARK OFFICE
CERTIFICATE OF CORRECTION

PATENT NO. : 5,612,823
DATED : March 18, 1997
INVENTOR(S) : Noboru Koizumi

It is certified that error appears in the above-identified patent and that said Letters Patent is hereby corrected as shown below:

<u>Column 5,</u>
Line 45, change "$f_1 = 17.19$" to -- $f_1 = 25.55$ --; and
Line 46, change "$f_2 = 25.55$" to -- $f_2 = 17.19$ --.

<u>Column 6,</u>
Line 2, change "$f_1 = 15.52$" to -- $f_1 = 31.04$ --;
Line 3, change "$f_2 = 31.04$" to -- $f_2 = 15.52$ --;
Line 26, change "$f_1 = 18.88$" to -- $f_1 = 22.21$ --;
Line 27, change "$f_2 = 22.21$" to -- $f_2 = 18.88$ --;
Line 51, change "$f_1 = 17.66$" to -- $f_1 = 24.60$ --; and
Line 52, change "$f_2 = 24.60$" to -- "$f_2 = 17.66$ --.

Signed and Sealed this

Fourth Day of September, 2001

*Attest:*

NICHOLAS P. GODICI
*Attesting Officer*   *Acting Director of the United States Patent and Trademark Office*